United States Patent [19]

Oda

[11] Patent Number: 5,327,168
[45] Date of Patent: Jul. 5, 1994

[54] ROLLED SHEET CONVEYING APPARATUS OF PLOTTER AND ROLLED SHEET CONVEYING ROUTE CONTROL METHOD.

[75] Inventor: Seiji Oda, Tokyo, Japan

[73] Assignee: Mutoh Industries Ltd., Tokyo, Japan

[21] Appl. No.: 854,697

[22] Filed: Mar. 20, 1992

[30] Foreign Application Priority Data

Apr. 24, 1991 [JP] Japan .................................. 3-119096

[51] Int. Cl.$^5$ ........................................... G01D 15/24
[52] U.S. Cl. ..................................... 346/136; 346/134; 346/139 R; 347/104
[58] Field of Search .................... 346/134, 136, 139 R, 346/1.1; 226/180, 194

[56] References Cited

U.S. PATENT DOCUMENTS

| | | | |
|---|---|---|---|
| 1,432,832 | 10/1922 | Brockett | 226/194 X |
| 2,821,387 | 1/1958 | Faeber | 226/180 X |
| 3,107,036 | 10/1963 | Richards et al. | 226/180 X |
| 4,172,565 | 10/1979 | Zaffarano | 242/67.1 R |
| 4,756,086 | 7/1988 | Yajima et al. | 33/18.1 |
| 4,827,292 | 5/1989 | Kuchta | 346/136 |
| 5,138,341 | 8/1992 | Kobayashi | 346/136 |

*Primary Examiner*—Benjamin R. Fuller
*Assistant Examiner*—J. E. Barlow, Jr.
*Attorney, Agent, or Firm*—Sughrue, Mion, Zinn, Macpeak & Seas

[57] ABSTRACT

In a paper sheet conveying operation for a plotter, a roller paper sheet 29 supported on a feeding roller 35 is slackened by way of rotation of the feeding roller. The suspended portion of the paper sheet is pulled up onto the platen 34 due to rotation of the drive roller 10. Then, the suspended portion of the paper sheet 29 passes through a pair of tension rollers 27 and 28 and receives weak tension from the tension rollers 27 and 28, thus preventing the paper sheet from snaking. When the tension rollers are not placed correctly in parallel to the Y-rail of the plotter, the distances of the left and right edges of the paper sheet from the tension rollers to the drive roller become unequal. Consequently, unequal tensions are generated in the opposing edges of the paper sheet when it passes between the tension rollers 27 and 28, thereby causing a discrepancy in the conveyance of the paper sheet 29. Solving the problem, a route length control mechanism is provided on the supporting portion of the tension rollers 27 and 28. As a result, the distances of the left and right edges of the paper sheet between the tension rollers 27, 28 and the drive roller 10 can be controlled and made substantially equal.

5 Claims, 6 Drawing Sheets (Front)

(Rear)

5,327,168

ROLLED SHEET CONVEYING APPARATUS OF PLOTTER AND ROLLED SHEET CONVEYING ROUTE CONTROL METHOD.

BACKGROUND OF THE INVENTION

The present invention relates to a rolled paper sheet conveying apparatus of a plotter using a paper roll and a rolled paper conveying route control method.

Conventionally, a plotter using paper rolls of an automatic drafting machine is known. The important point of such plotter is that the rolled paper sheet is pulled out to a platen of the automatic drafting machine with a uniform tension on left and right edges of the sheet and rolled around a winding means with a uniform tension effective along the transverse direction of the sheet. Attaining such uniform tension on a sheet to be enables the sheet supplied to a correct and precise position on the platen.

In order to obtain a construction of the rolled paper conveying apparatus of the plotter enabling to attain uniform tension on both edges of the sheet, it has been necessary to manufacture respective parts and assemble them with high precision. This is because lengths of left and right conveying routes of the rolled paper must be equal to each other, and a drafting roller, a feeding roller (feeding means), and a winding roller (winding means) must be arranged in a three-dimensional parallel relation.

It is noted that it is very difficult to always obtain a high degree of precision in manufacturing the parts and assembling them with a reasonable cost. If high degree precision is attained in the parts and their assembly, it is very difficult to keep the precision for a long period of usage and in transportation of the plotter.

It has been found that when a predetermined range for one frame of the sheet paper in the plotter is made suspended, after a upon drawing the sheet paper, taking the sheet from the winding roller, by a feeding operation of a drive roller and winding the no-tensioned suspended sheet onto the winding roller, sheet winding error, generated from a small installation error of the winding roller and a front tension roller placed upstream of the winding roller, can be controlled or diminished by a flange of the winding roller.

Feeding roller installation error can be solved by paying out a sheet part of the rolled paper through a feeding roller so as to make the sheet part slacken, and then pulling up the slackened sheet part onto the platen through the drive roller so as to convey the sheet correctly.

However, this conventional idea has the shortcoming as that only slackening the paper and pulling up it by the drive roller causes some snake-motion of the running sheet.

In order to prevent the running paper sheet from being snaked, the plotter has been provided with a set of tension rollers on its legs so as to give weak tension to the sheet placed at its feeding side. When the installation axis of the tension roller is not perfectly parallel to a Y-axis of the tension roller, it is difficult or impossible to precisely convey the paper sheet onto the platen.

SUMMARY OF THE INVENTION

Consequently, it is a main purpose of the present invention to provide a rolled paper sheet conveying apparatus of a plotter of an automatic drafting machine and a rolled paper sheet conveying route control method for the plotter enabling correct feeding of the rolled paper sheet supported on a feeding means onto the platen so as to solve the shortcoming above of the conventional apparatus and method.

According to the rolled paper sheet conveying apparatus and the rolled paper sheet conveying route control method of the prior art, the rolled paper sheet supported on the feeding means slackens or makes dependent by its part of one drawing by a rotation of the feeding means. The slack and depending portion of the rolled paper sheet is pulled up by rotations of the drive roller onto the platen. In this time, the slack portion of the sheet passes through tension rollers and is given weak tension or stress, so that snake-motion of the running paper sheet stops. When left and a right travelling lengths of the paper sheet between the tension roller and the drive roller are not determined equally and the paper sheet is pulled up by the drive roller, non-equal or different tensions are given to the left edge and the right edge of the running paper sheet generating conveyance error of the paper sheet.

In order to eliminate such conveyance error, a travelling distance or length control mechanism is provided on a supporting portion of the tension rollers of the plotter according to the present invention. The travelling distance control mechanism of the present invention adjusts left and a right route lengths or distance of the running paper sheet between the tension roller and the drive roller so as to make them equal. Controlling the left and the right travelling distance of the paper sheet between the tension roller and the drive roller to make them equal to each other enables to convey the sheet paper along correct conveying route while the roller paper is pulled up by the drive roller preventing the rolled paper from being given any conveyance error.

DETAILED EXPLANATION OF THE INVENTION

The construction of the roller paper sheet conveying apparatus of the plotter and a rolled paper conveying route control method, respectively of the present invention with reference to the embodiment shown in the accompanying drawing.

Figure 3:
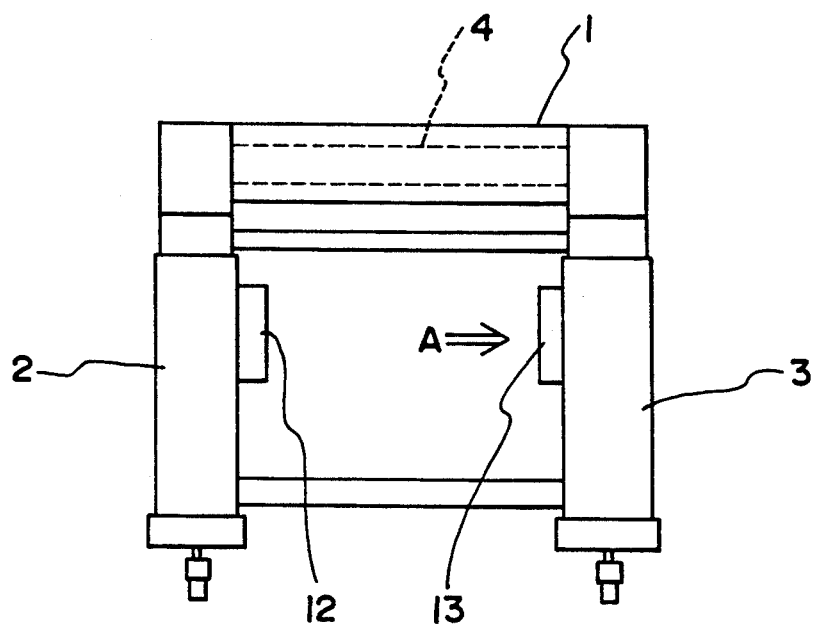
FIG. 3 is a front view of the plotter.
Figure 4:
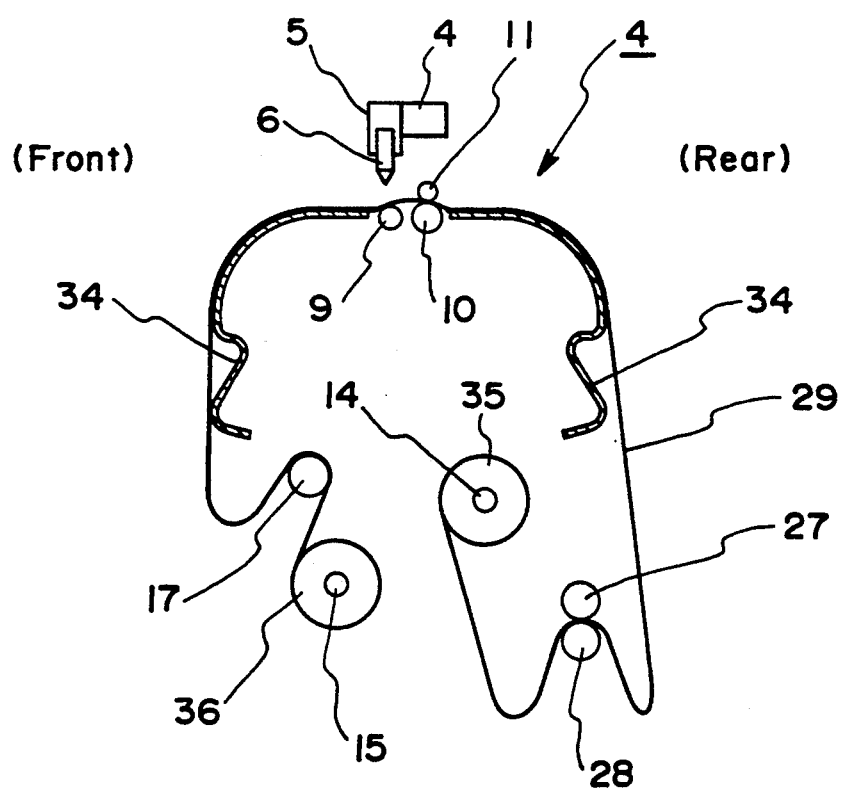
FIG. 4 is a side elevation of a whole construction of the plotter.

As shown in FIG. 3, a machine frame 1 of the plotter of a sheet drive type which uses rolled paper is supported by a left and a right legs 2 and 3. A Y-rail 4 is mounted or bridged horizontally and in parallel with the floor on the machine frame 1. As shown in FIG. 4, the Y-rail has a drawing head 5 operatively connected to a Y drive system through a transverse carsor (not shown) and movably instaleld on it.

A pen holder (not shown) is connected to an elevatable drive apparatus contained in a casing of the drawing head 5, and a writing instrument 6 is detachably held by the pen holder.

Figure 8:
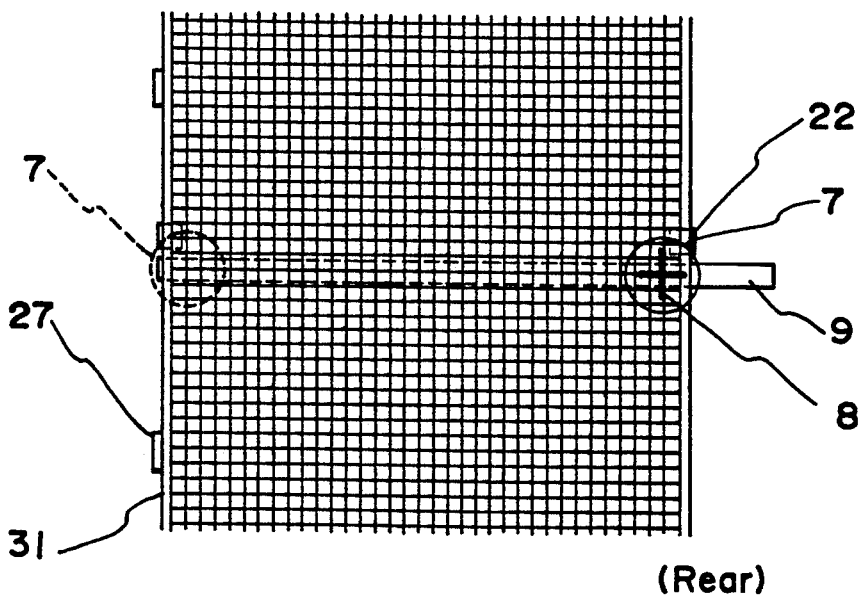
FIG. 8 is a plan view of the plotter and the jig paper installed on the plotter.

The drawing head 5 is constructed so as to detachably install the scope (enlarging lens) 7 shown in FIG. 8 thereon.

The scope 7 has an indication mark of a cross 8.

The machine frame 1 has a drawing roller 9 and a sheet drive roller 10 connected to a X drive system. The driving roller 9 and the sheet drive roller 10 are rotatably supported on the machine frame 1.

Above the sheet drive roller 10, there is a pressing roller 11 installed so as to be liftable. On the drawing of FIG. 3, the left leg 2 has the chassis 12 secured thereto and the right leg 3 has another chassis 13 secured thereto so as to correspond to the chassis 12.

Figure 7:
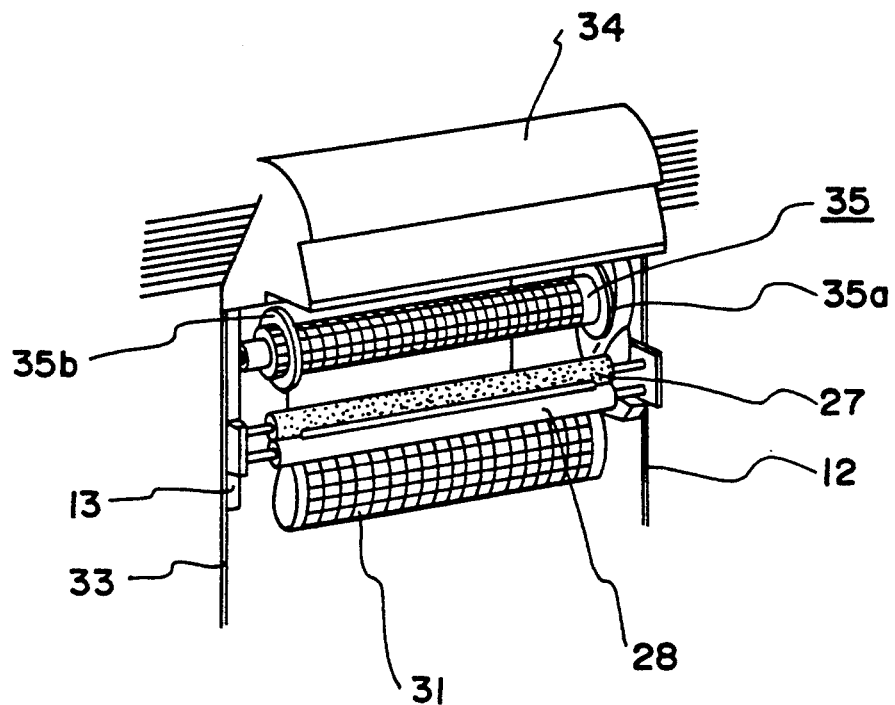
FIG. 7 is a perspective rear view of the plotter with the jig paper cut at is mid portion.
Figure 9:
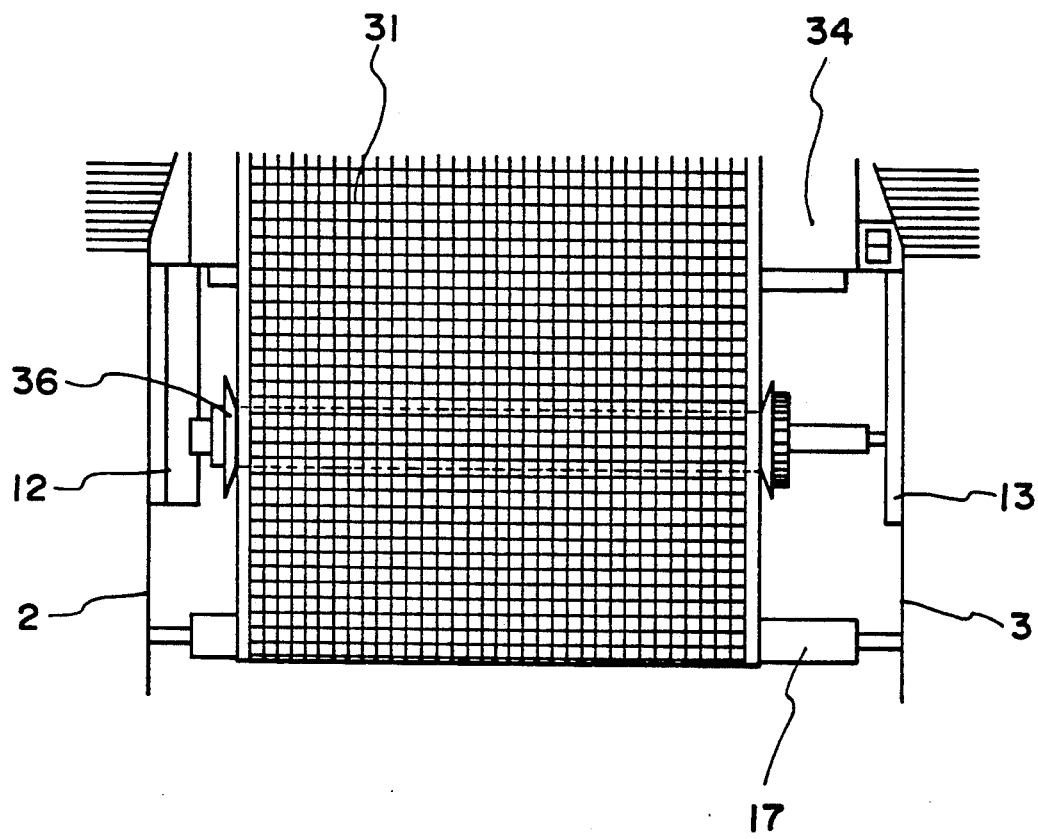
FIG. 9 is a front view of a part of the plotter provided with the jig paper applied thereon.

As illustrated in FIGS. 7 and 9, chassis 12 has a fixing portion (not shown) for a known feeding means 35 (feeding roller) and another fixing portion (not shown) for a known winding means 36 (winding roller).

Figure 1:
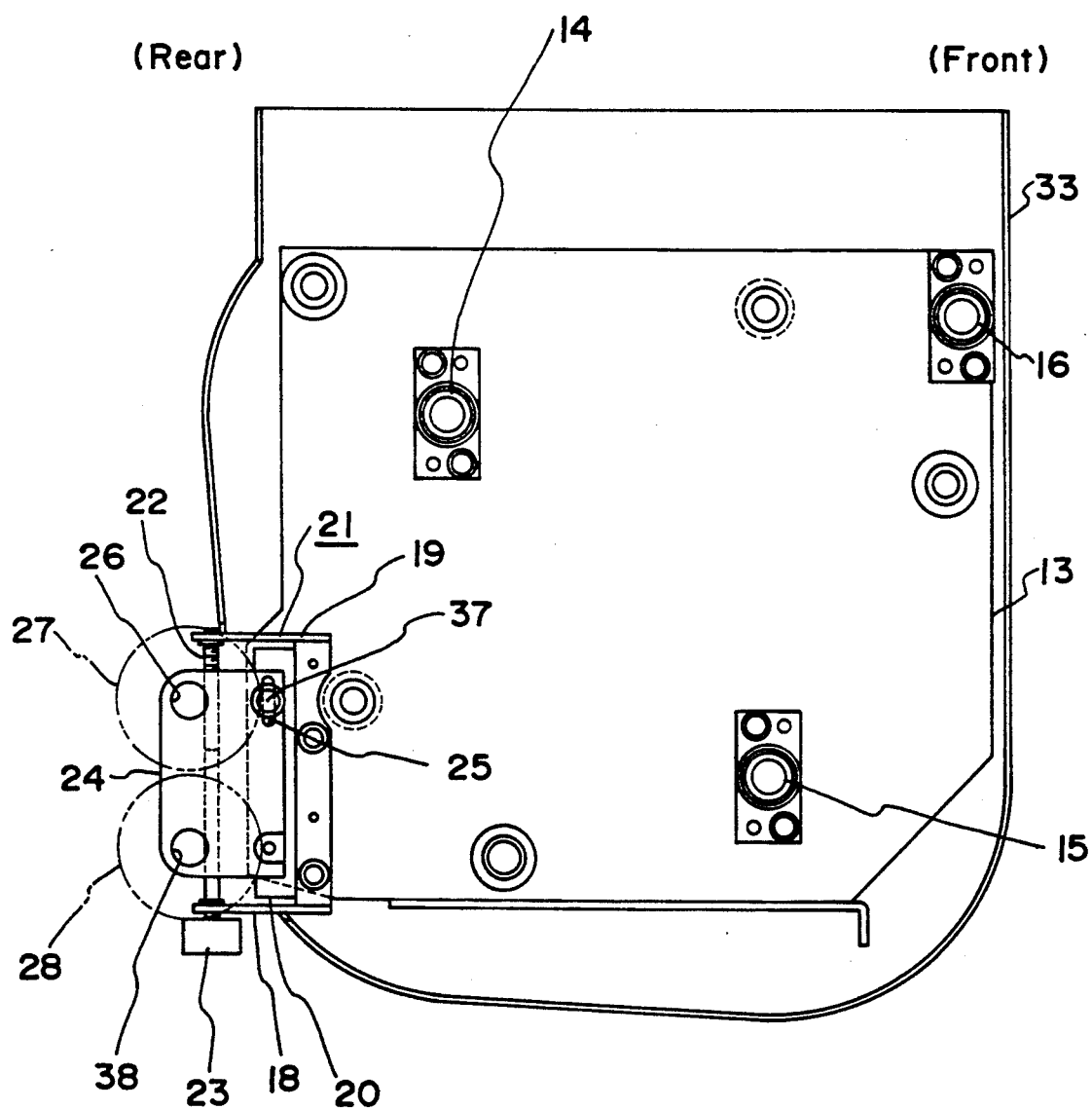
FIG. 1 is a side elevation of an arrow A in FIG. 3 showing a chassis and a portion of the present invention.

Corresponding to respective fixing portions for the feeding means 35 and the winding means 36 of the chassis 12, the chassis 13 has a known cylindrical fixing portion 14 for the feeding means 35 and a known cylindrical fixing portion 15 for the winding means 36 as shown in FIG. 1.

Both ends of a front tension roller 17 are rotatably and detachably supported on a roller fixing portion (not shown) of the chassis 12 and the roller fixing portion 16 (see FIG. 1) of the chassis 13.

Figure 2:
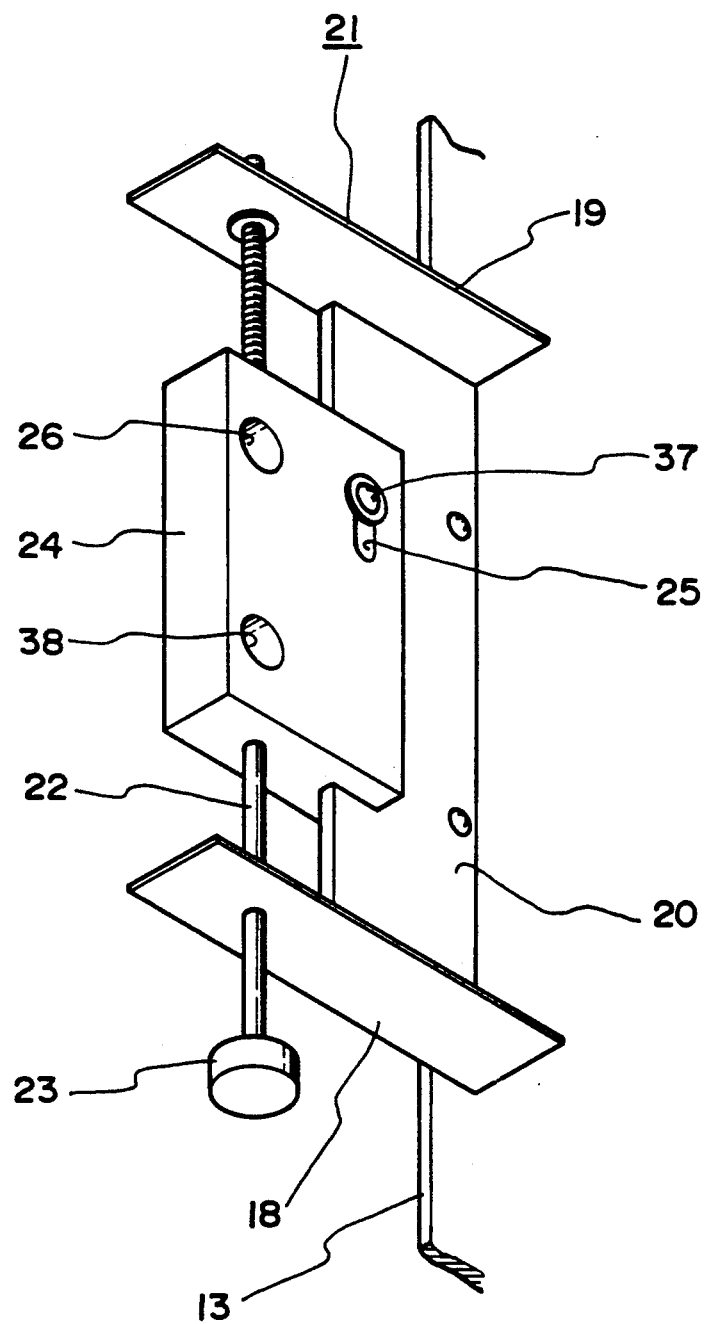
FIG. 2 is an explanatory perspective view of the route length control mechanism of the present invention.

Under a rear side of the chassis 13, there is a supporter body 21 consisting of a pair of route control stays 18 and 19, and a guide plate 20 integral with the stays. The guide plate 20 of the supporter body 21 is secured to the chassis 13 by a screw as shown in FIG. 2.

At a fixed position between the stays 18 and 19, a screw shaft 22 is rotatably supported. An adjusting knob 23 is fixed to an end protruding from an outer end of the stay 18 of the screw shaft 22.

The screw shaft 22 is threaded with a threaded hole of the roller receiver 24 and the roller receiver 24 is slidably fitted to the guide plate 20.

The roller receiver 24 has an oval hole 25 extending along a direction in parallel to the screw shaft 22 and a lock screw 37 is sladably fitted into the oval hole 25.

The lock screw 37 is threaded to a screw hole formed in the guide plate 20. The lock screw 37 is adapted to secure the roller receiver 24 so as to be releasable or detachably. The screw shaft 22 is set in about a perpendicular direction relative to the floor. The roller receiver 24 has a pair of bearing holes 26 and 38 installed along a direction in parallel with the screw shaft 22.

The chassis 12 has a roller receiver (not shown) installed thereon so as to correspond to the roller receiver 24.

Threaded portions of both ends of a pair of rear tension rollers 27 and 28 are rotatably fitted to the pair of bearing holes 26, 38 and a pair of bearing holes of the non-shown roller receiver. Thee rear tension rollers 27 and 28 are arranged in parallel to each other and in substantially horizon relative to the floor, and they are faced to each other with a distance a little wider than a thickness of a sheet of roller paper.

The route distance control mechanism consists of a supporter 21, screw shaft 22, and a roller receiver 24.

Figure 5:
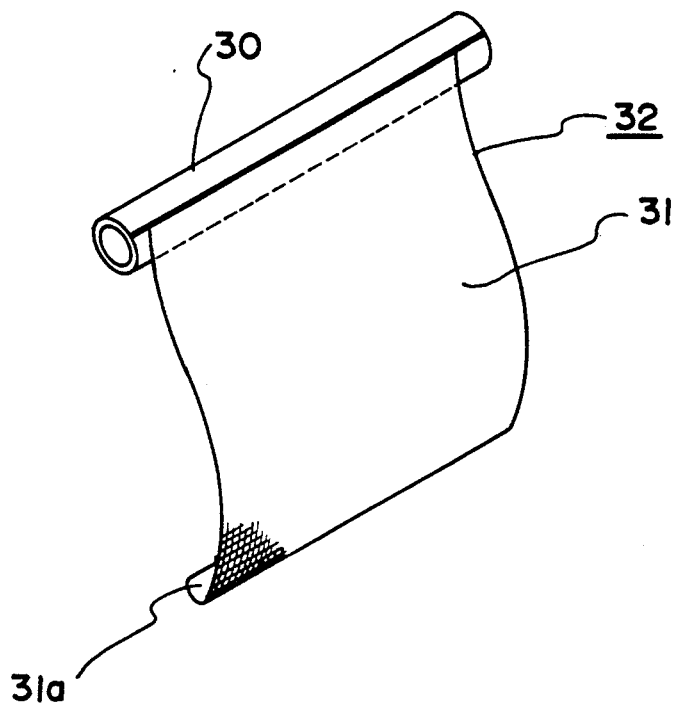
FIG. 5 is a perspective view of a jig paper.
Figure 6:
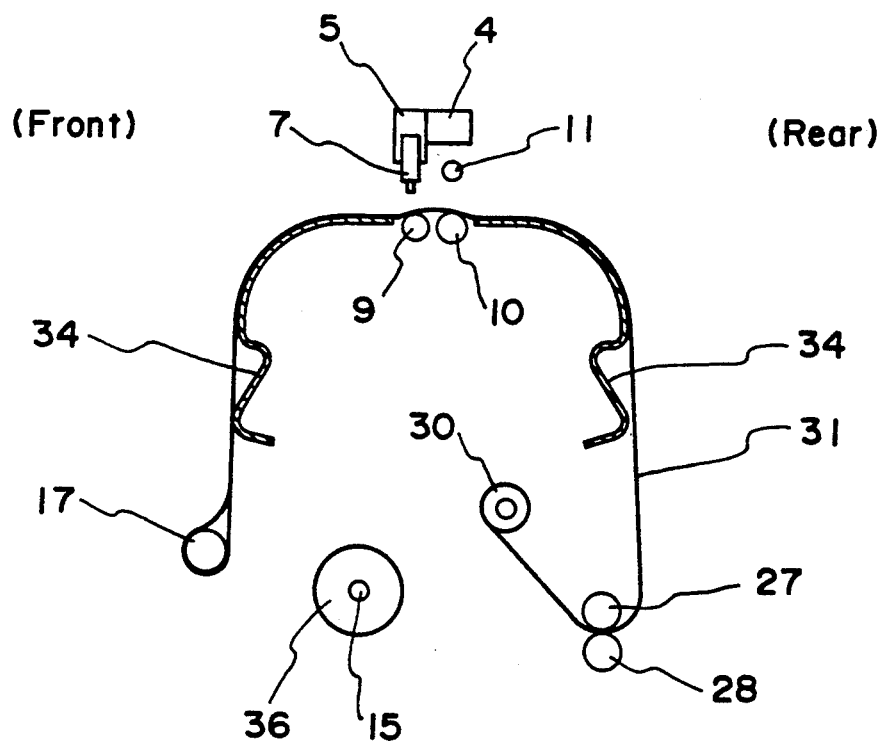
FIG. 6 is a side elevation of a whole construction of the plotter with the jig paper installed on it.

As shown in FIG. 5, a Miller cross-section paper sheet 31 is attached to a paper sheet 30. An open end 31a of the Miller cross-section paper sheet 31 is constructed in a bag type, and the paper cylinder 30 and the Miller section paper sheet 31 construct a jig paper 32.

The horizontal lines drawn in the cross-section paper sheet 31 are set in parallel to the central axial lines of the paper cylinder 30.

The fixing means of the feeding means and the winding means of the chassis 12, respectively are connected to two motors (not shown) connected to the chassis 12 and these motors are adapted to be controlled by a controller.

The chassis 13 is secured to a cover 33 fixed to the leg 3 by a fixing screw. The machine frame 1 has a platen 34 installed thereon.

Operation of the rolled paper conveying apparatus of the embodiment above according to the present invention will be explained.

First, the paper cylinder 30 of the jig paper 32 is set between the flanges 35a and 35b of the feeding means 35. Next, the feeding means 35 with the paper cylinder 30 installed thereon is set between the fixing portions 14 of the feeding means on the chassis 12 and 13 as shown in FIG. 4.

Next, the scope 7 is set on the drawing head 5.

Then, an operator walks to a rear side of the machine body 1, pulls out the cross-section paper sheet 31 of the jig paper 32, makes the cross-section sheet 31 pass from under the tension roller 27 to between the press roller 11 and the drive roller 10 and takes out the cross-section sheet to a place in front of the plotter. At this time, the press roller 11 is placed at a raised position.

Next, the tension roller 17 at a front of the plotter is displaced and the tension roller 17 is inserted transversely into the rolled or bag-like portion of the cross-section sheet 31.

Using the scope 7, the parallel lines of the cross-section paper sheet 31 are looked at from their left ends to right ends. When the left ends of the parallel lines are placed at higher positions than the right ends of the lines and the cross lines 8 of the scope 7, it is said that the cross-section paper sheet 31 is slanted counterclockwise relative to the Y-axis or an axial direction of the Y-rail, so that the knob 23 placed at a rear of the right leg 3 is turned left. Consequently, the roller receiver 24 rises and the rear tension rollers 27 and 28 are slanted diminishing the slant of the cross-section paper 31.

On the contrary, on the drawing of FIG. 8, when the right ends of the parallel lines are placed below the cross-line mark 8, it is said that the cross-section paper sheet 31 is slanted clockwise relative to the Y-axis line. Accordingly, the knob 23 turns to the right so as to lower the roller receiver 24, and rear tension rollers 27 and 28 are slanted correcting the direction of the cross-section paper sheet 31.

Thus, any discrepancy between the lines of the cross-section paper 31 and a Y-axis line between two center points of the cross-line mark 8 of the scope 7 can be corrected, making it drop within plus-and-minus 0.5 mm. Also, the tension rollers 27 and 28 are controlled in their parallelism so as to make the discrepancy as small as possible. FIG. 8 shows a condition of the lines of the cross-section paper sheet 31, which lines have no discrepancy relative to the Y-axis line.

After the operation of route distance or length control, the tension roller 17 in front of the plotter is drawn out of the jig paper 32 and placed at its original position.

The operator turns the feeding means 35 at back of the plotter and the cross-section paper sheet 31 is wound onto the paper cylinder 30. Then, the feeding means 35 is displaced from its fixing portion 14 and the jig paper 32 is drawn out of the feeding means 35.

Next, the operator sets a rolled portion of the paper sheet 29 on the feeding means 35 and the feeding means 35 is set on its fixing portion 14.

Then, the paper sheet 29 is payed out of the paper roll, the paper sheet 29 advances through between the tension rollers 27 and 28, the drive roller 10 and the press roller 11, and around the tension roller 17. Finally, a leading edge of the paper sheet 29 is engaged with the winding means 36 installed on the fixing portion 15 for the winding means. Thus, a drawing preparation is over.

After the drawing, the roller 10 rotates under a function of the controller to slacken a drawn part of the paper sheet 29 making pendant of the drawn part at a side of the winding means 36. The pendant drawn portion of the paper sheet 29 is wound around the winding means 36 due to a driving of the motor.

The motor drives and rotates the feeding means 35 to pay out the paper sheet 29 of the rolled paper, the payed out portion of the paper sheet is pulled out onto the platen 34 due to a rotation of the drive roller 10. Thereby, a part of the paper sheet 29 to be drawn thereon is supplied to the platen 34.

Then, the tension rollers 27 and 28 give weak tension to the paper sheet 29. Thus the paper sheet 29 is prevented from snaking and the left and right route lengths or distances of the paper sheet 29 between the tension rollers 27 and 28, and the drive roller 10 are made equal. Accordingly, it is apparent that the paper sheet 29 is supplied to the platen 34 from the paper roll correctly with the left and right equal tensions applied to the paper sheet 29.

What is claimed is:

1. A rolled paper conveying apparatus for use with a plotter, comprising:

a feeding means supporting rolled paper and being rotatably supported on legs of said plotter;

a pair of tension rollers being journalled with respect said legs in order to impart weak tension to the paper sheet;

winding means for winding a payed-out portion of the paper sheet onto said winding means through a drive roller installed on the machine body, said winding means being rotatably journalled therewith; and a route distance control mechanism associated with said tension rollers, for adjusting slants of said tension rollers so that said paper sheet is made parallel to a Y-rail of said plotter.

2. The rolled paper conveying apparatus according to claim 1, wherein said route distance control mechanism mounts a pair of roller receivers that supports both ends of the pair of tension rollers between a pair of chassis respectively fixed to said legs so as to arrange the tension rollers in parallel to each other with a gap a little larger than a sheet thickness therebetween, and to adjust the transfer of one roller receiver in a vertical direction.

3. A method of controlling a conveying route of rolled paper on a plotter, comprising the steps of:

installing a paper cylinder on a feeding means of said plotter;

pulling out a length of paper from said cylinder onto a platen by means of a drive roller, said length of paper having parallel lines drawn upon it;

passing said length of paper through said tension rollers so as to impart weak tension to said paper; and adjusting the slant of said tension rollers so as to make said lines on said length of paper parallel with a Y-rail of said plotter.

4. The method according to claim 3, wherein said adjusting step further comprises the steps of:

moving a scope, having a mark and being disposed on a drawing head of said plotter, along said Y-rail of said plotter; and measuring the slant of said parallel lines with respect to said Y-rail.

5. The method according to claim 3, wherein said adjusting step is controlled by the results of said measuring step.

* * * * *